(No Model.)
H. J. MARTIN.
WRENCH.
No. 544,739. Patented Aug. 20, 1895.
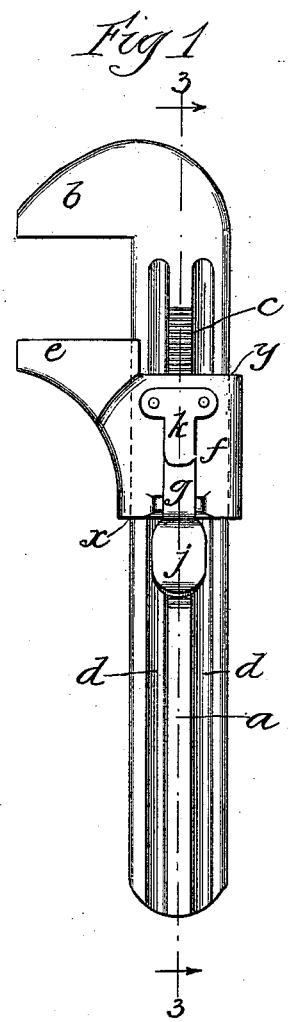
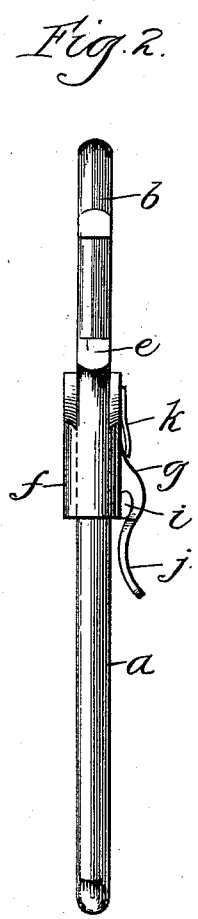
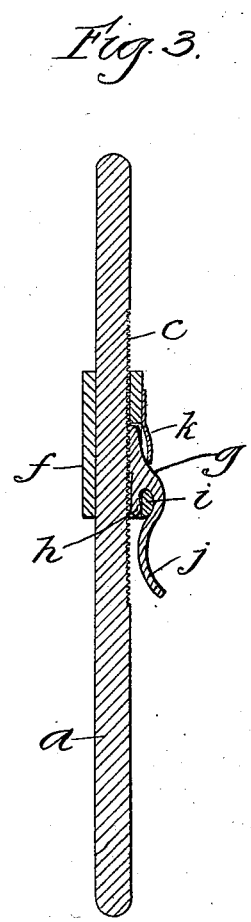
Witnesses
Wm. F. Henning
Charles L. Hine
Inventor
Henry J. Martin
By Albert H. Baker, Atty.

UNITED STATES PATENT OFFICE.

HENRY J. MARTIN, OF CHICAGO, ILLINOIS, ASSIGNOR TO THE WHITMAN & BARNES MANUFACTURING COMPANY, OF AKRON, OHIO.

WRENCH.

SPECIFICATION forming part of Letters Patent No. 544,739, dated August 20, 1895.

Application filed May 7, 1895. Serial No. 548,418. (No model.)

*To all whom it may concern:*

Be it known that I, HENRY J. MARTIN, a citizen of the United States, residing in the city of Chicago, county of Cook, and State of Illinois, have invented a certain new and useful Improvement in Wrenches, of which the following is a full, clear, and exact description, reference being had to the accompanying drawings.

The object of my invention is to provide a wrench which may be quickly and easily adjusted to fit different-sized nuts and bolts, but which will not slip or lose its adjustment during use, and which may be cheaply constructed and easily put together.

My improved wrench is of the monkey-wrench type and consists of a stationary jaw, from which extends a bar along which a movable jaw slides, there being teeth along the bar in which a dog pivoted to the movable jaw may be held by a spring; and my invention consists in the peculiar arrangement of this dog and the method of pivoting it to the sleeve. The withdrawal of the dog from connection with the notches allows the movable jaw to be slid along the bar until it is the desired distance from the stationary jaw, when the engagement of the dog with the bar under the action of the spring holds the jaw securely in place.

The drawings show my invention in an approved form.

Figure 1 is a side view of my improved wrench, and Fig. 2 a view along the front edge of the same. Fig. 3 is a section through the bar and stationary jaw, taken on the line 3 3 of Fig. 1, looking in the direction of the arrow.

$a$ is a bar which serves both as a handle for the wrench and a guide-bar for the movable jaw. The stationary jaw $b$ is attached to the end of this bar, the two being preferably made of one piece of metal. On one side of this bar are teeth $c$. For convenience of construction I prefer to make two parallel grooves $d$ along this side of the bar, as shown, thus leaving a strip relatively raised, across which the teeth are cut; and for the sake of lightness and neatness two similar grooves are made on the opposite side of the bar. The movable jaw $e$ is made with a sleeve $f$, which closely surrounds this bar $a$ and is slidable thereon. Pivoted to this sleeve on the side thereof and extending through a hole in the same is the dog $g$. The pivoting of this dog is done in the peculiar manner shown. The dog is formed of a single piece of metal, substantially in the shape shown, having an inner face on which there are formed teeth corresponding to the spaces between the teeth on the bar, an outer end formed into a suitable thumb or finger lever, and a lug $h$ on its inner side about midway of its length. A raised cross-rod $i$ is formed on the side of the sleeve $f$, integral therewith, at the rear end of the hole through said side, and at the other end of the hole there is attached to the sleeve a flat spring $k$, the prong of which extends for some distance over the hole. When the movable jaw is off of the bar $a$, the front end of the dog is inserted in the hole in the side of the sleeve between the cross-rod $i$ and the spring $k$, and the dog is shoved in, bending the spring outward until the lug $h$ passes beyond the cross-rod $i$, when the spring forces the dog inward and backward, the lug passing under the cross-rod. The spring $k$, while allowing the dog great freedom of action and ample play, holds the same onto its pivot so securely that it is only by the application of a considerable force that it may be removed. After the dog has been thus placed in position the movable jaw is slid on the bar and the spring $k$, pressing on the inner end of the dog, holds the inner face thereof in contact with the bar until it is withdrawn by a pressure on the opposite end of thumb-lever $j$. This arrangement of the dog and sleeve is simpler and cheaper and more easily put together than in a construction where the dog is pivoted by a separable pin running through it and the sleeve.

In the operation of my improved wrench the finger end $j$ of the dog is pressed toward the bar $a$, thus withdrawing the teeth on the inner face from engagement with the bar. The movable jaw is then slid along until it is the proper distance from the stationary jaw to take the desired bolt or nut. The pressure is then removed from the finger-end of the dog and the spring $k$ causes the dog to engage with the bar, thus locking the movable jaw to it. It will be noticed that by placing the locking device on the side of the wrench, as shown, the dog is relieved from a portion of the strain during use, as there is a slight binding of the inner corners $x$ and $y$ of the sleeve on the rod when in action, caused by the tendency of the movable jaw to rotate.

Having thus described my invention, what I claim as new, and desire to secure by Letters Patent, is—

In a wrench, in combination, a stationary jaw, a bar extending therefrom, a series of teeth formed on the side of said bar, a movable jaw having a sleeve surrounding said bar, there being a hole in the side of said sleeve and a raised cross-bar formed integral with the sleeve at the rear of said hole, a spring secured to said sleeve at the front of said hole and pressing inward, a dog adapted to lie in said hole and having an inner face arranged to lie substantially parallel with the bar, having an outer end forming a thumb-lever and having, intermediate of its length, on its under side, a lug adapted to hook under the said cross-bar, all constructed and arranged substantially as described and operating in the manner set forth, whereby the dog may be slipped into position without other separation of the parts than removing the movable jaw from the bar and may be securely held when the movable jaw is on the bar.

HENRY J. MARTIN.

Witnesses:
CHARLES L. HINE,
ALBERT H. BATES.